United States Patent
Mårtensson et al.

(10) Patent No.: US 9,781,292 B2
(45) Date of Patent: Oct. 3, 2017

(54) LIFELOG CAMERA AND METHOD OF OBTAINING A DIGITAL IMAGE TAGGED WITH CORRECTED IMAGE DIRECTION INFORMATION

(71) Applicants: SONY CORPORATION, Tokyo (JP); Linus Mårtensson, Lund (SE); Ola Thörn, Limhamn (SE); Henrik Bengtsson, Lund (SE)

(72) Inventors: Linus Mårtensson, Lund (SE); Ola Thörn, Limhamn (SE); Henrik Bengtsson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 143 days.

(21) Appl. No.: 14/388,580

(22) PCT Filed: Jun. 3, 2014

(86) PCT No.: PCT/IB2014/061928
§ 371 (c)(1),
(2) Date: Sep. 26, 2014

(87) PCT Pub. No.: WO2015/185961
PCT Pub. Date: Dec. 10, 2015

(65) Prior Publication Data
US 2016/0255269 A1 Sep. 1, 2016

(51) Int. Cl.
*H04N 1/21* (2006.01)
*H04N 1/00* (2006.01)
*H04N 1/32* (2006.01)

(52) U.S. Cl.
CPC ....... *H04N 1/2125* (2013.01); *H04N 1/00251* (2013.01); *H04N 1/215* (2013.01); *H04N 1/2112* (2013.01); *H04N 1/32101* (2013.01)

(58) Field of Classification Search
CPC .......... H04N 5/23229; H04N 5/23216; H04N 1/2125
See application file for complete search history.

(56) References Cited

U.S. PATENT DOCUMENTS

2004/0100567 A1* 5/2004 Miller ................ G02B 27/0093
348/239
2005/0104976 A1* 5/2005 Currans ................ H04N 5/772
348/231.5

(Continued)

OTHER PUBLICATIONS

International Search Report and Written Opinion from corresponding International Application No. PCT/IB2014/061928, mailed on Aug. 21, 2014.

*Primary Examiner* — Gevell Selby
(74) *Attorney, Agent, or Firm* — Renner, Otto, Boisselle & Sklar, LLP

(57) ABSTRACT

Obtaining a digital image tagged with corrected image direction information includes capturing and storing a digital image of a scene defined by a field of view of a lifelog camera (10) used to capture the image. A forward-facing direction (28) of a user of the lifelog camera is identified, the forward-facing direction within the field of view of the lifelog camera. A component of the image that contains image data corresponding to a portion of the scene containing the forward-facing direction of the user is also identified. The digital image is then tagged with the identified component.

20 Claims, 3 Drawing Sheets

(56) References Cited

U.S. PATENT DOCUMENTS

| | | | |
|---|---|---|---|
| 2010/0079356 A1* | 4/2010 | Hoellwarth | G02B 27/017 345/8 |
| 2010/0085462 A1 | 4/2010 | Sako et al. | |
| 2013/0169822 A1* | 7/2013 | Zhu | G06T 7/0018 348/180 |
| 2014/0063060 A1* | 3/2014 | Maciocci | G06F 3/011 345/633 |
| 2014/0285521 A1* | 9/2014 | Kimura | G06T 19/006 345/633 |

* cited by examiner

LIFELOG CAMERA AND METHOD OF OBTAINING A DIGITAL IMAGE TAGGED WITH CORRECTED IMAGE DIRECTION INFORMATION

TECHNICAL FIELD OF THE INVENTION

The technology of the present disclosure relates generally to lifelog cameras and, more particularly, to a lifelog camera that obtains a digital image tagged with corrected image direction information.

BACKGROUND

A lifelog camera is a camera device that is typically worn by a user and used to capture photos passively on a timed basis. These photos serve as a photographic memory of events occurring near the user. However, under this approach, many of the images captured by conventional lifelog cameras are not very interesting. In particular, the content of the photos captured by a lifelog camera depends entirely on the scene within the camera's field of view when the photo is captured. And because these cameras are often worn on clothing, the scene within the camera's field of view may be offset from the scene that is in front of the user. More interesting events may occur in front of the user, but outside the camera's field of view. Therefore, a lifelog camera's memory may become filled with photos that are not of interest to the user since it is difficult to synchronize the camera's field of view with the view in front of the user.

SUMMARY

The disclosed techniques for obtaining a digital image of a scene tagged with corrected image direction information involve capturing and storing a digital image of a scene with a lifelog camera having a wide-angle lens, identifying a forward-facing direction of a user of the camera assembly, identifying the portion of the image that contains the forward-facing direction of the user, and tagging the digital image with that information.

According to one aspect of the disclosure, a method of obtaining a digital image tagged with corrected image direction information includes capturing and storing a digital image of a scene defined by a field of view of a lifelog camera used to capture the image, identifying a forward-facing direction of a user of the lifelog camera, the forward-facing direction within the field of view of the lifelog camera; identifying a component of the image that contains image data corresponding to a portion of the scene containing the forward-facing direction of the user; and tagging the digital image with the identified component.

According to an embodiment of the method, the lifelog camera includes a wide-angle lens.

According to an embodiment of the method, the wide-angle lens includes a fisheye lens.

According to an embodiment of the method, identifying the forward-facing direction of the user includes determining the direction of travel of the user.

According to an embodiment of the method, the direction of travel is determined using an accelerometer.

According to an embodiment of the method, the method further includes identifying an additional component of the image that contains image data corresponding to a portion of the scene containing a feature of interest and tagging the digital image with the identified additional component.

According to an embodiment of the method, the method further includes displaying a portion of the image including the identified additional component, the displayed portion corresponding to a smaller portion of the scene than the captured digital image.

According to an embodiment of the method, the method further includes displaying a portion of the image including the identified component, the displayed portion corresponding to a smaller portion of the scene than the captured digital image.

According to an embodiment of the method, the method further includes displaying additional portions of the image in response to a user command.

According to an embodiment of the method, the size of the displayed portions is determined by the user.

According to one aspect of the disclosure, an electronic device includes a direction sensor, a camera module and a control circuit. The control circuit is configured to capture and store a digital image of a scene defined by a field of view of the camera module used to capture the image.

According to an embodiment of the electronic device, the camera module includes a wide-angle lens.

According to an embodiment of the electronic device, the wide-angle lens includes a fisheye lens.

According to an embodiment of the electronic device, identifying the forward-facing direction of the user includes determining the direction of travel of the user using the direction sensor.

According to an embodiment of the electronic device, the direction sensor includes an accelerometer.

According to an embodiment of the electronic device, the control circuit is further configured to identify an additional component of the image that contains image data corresponding to a portion of the scene containing an item of interest and tag the digital image with the identified additional component.

According to an embodiment of the electronic device, the device further includes a display and the control circuit is further configured to display a portion of the image including the identified additional component, the displayed portion corresponding to a smaller portion of the scene than the captured digital image.

According to an embodiment of the electronic device, the device further includes a display and wherein the control circuit is further configured to display a portion of the image including the identified component, the displayed portion corresponding to a smaller portion of the scene than the captured digital image.

According to an embodiment of the electronic device, the control circuit is further configured to display additional portions of the image in response to a user command.

According to an embodiment of the electronic device, the size of the displayed portion is determined by the user.

DETAILED DESCRIPTION OF EMBODIMENTS

Figure 1:
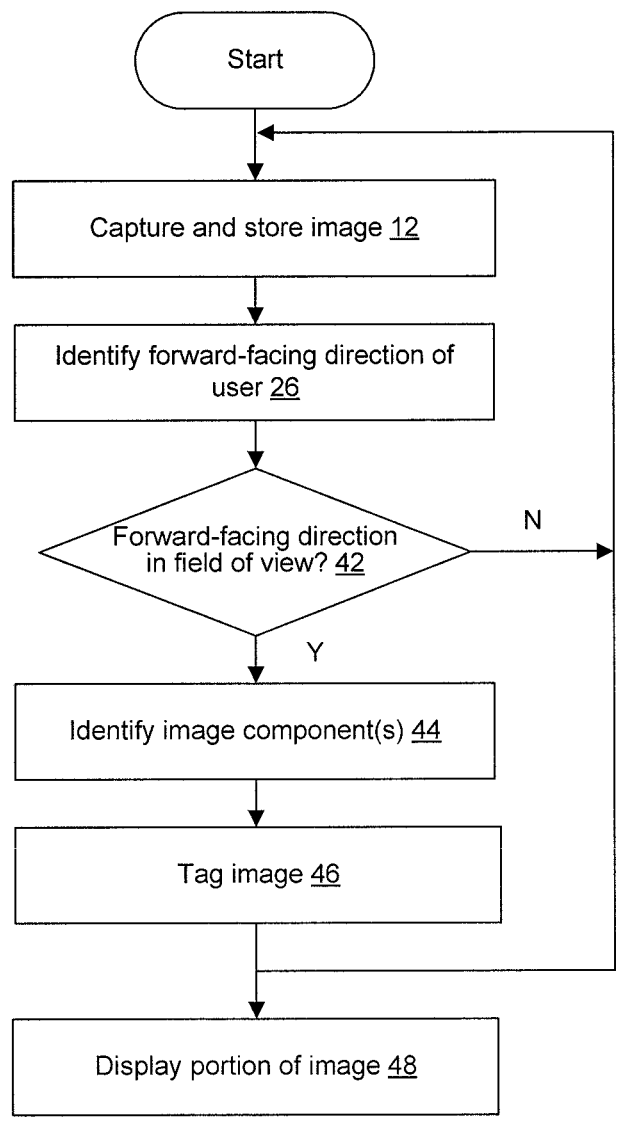
FIG. 1 is a flow diagram of functions carried out by the lifelog camera.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and method of controlling the electronic device to obtain tagged photographs. The electronic device is typically—but not necessarily—a dedicated lifelog camera. In other embodiments, the electronic device may be some other portable electronic device such as, but not limited to, a mobile telephone, a tablet computing device, a gaming device, a digital point-and-shoot camera, or a media player.

With initial reference to FIG. 1, illustrated is an exemplary flow diagram representing steps that may be carried out by a lifelog camera 10 (FIGS. 2 and 3) to obtain a digital image tagged with corrected image direction information. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

Figure 2:
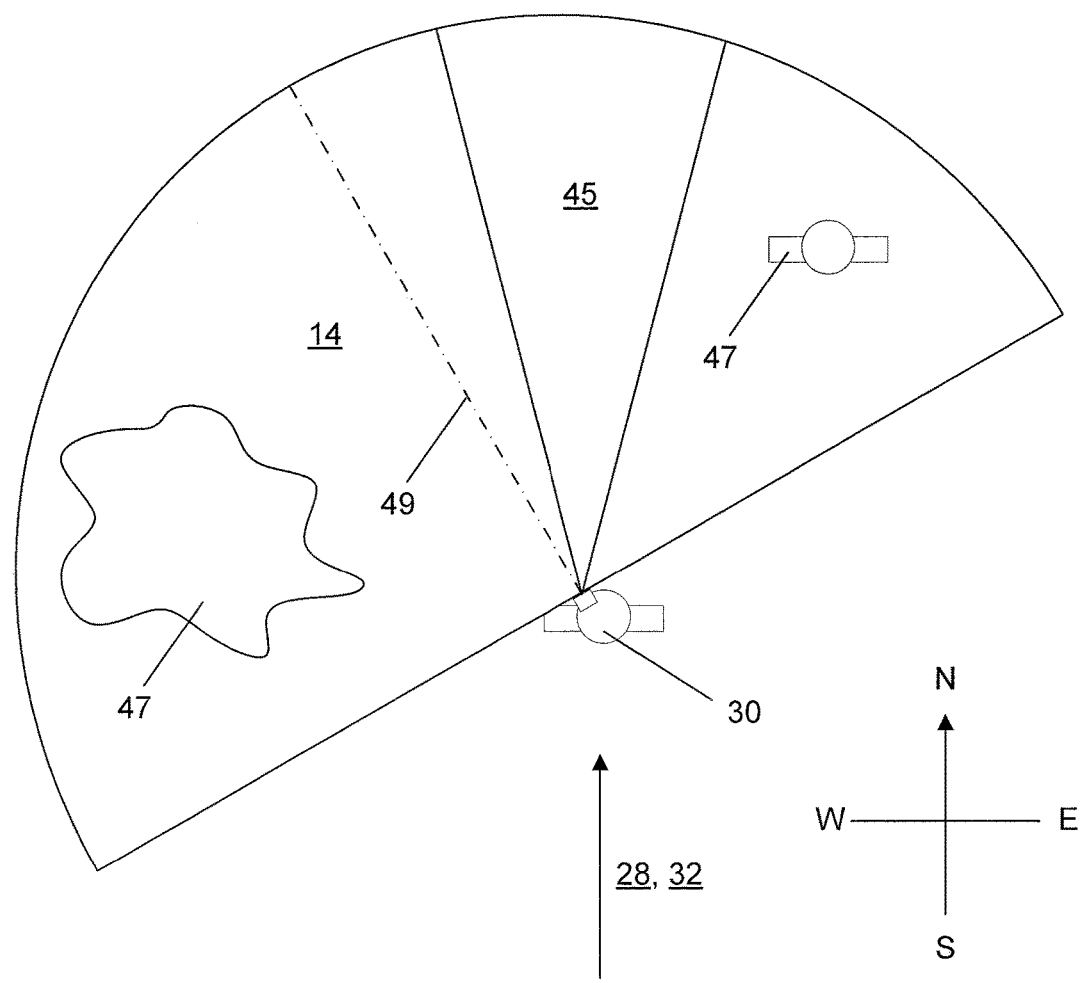
FIG. 2 is a schematic view of the lifelog camera in use.
Figure 3:
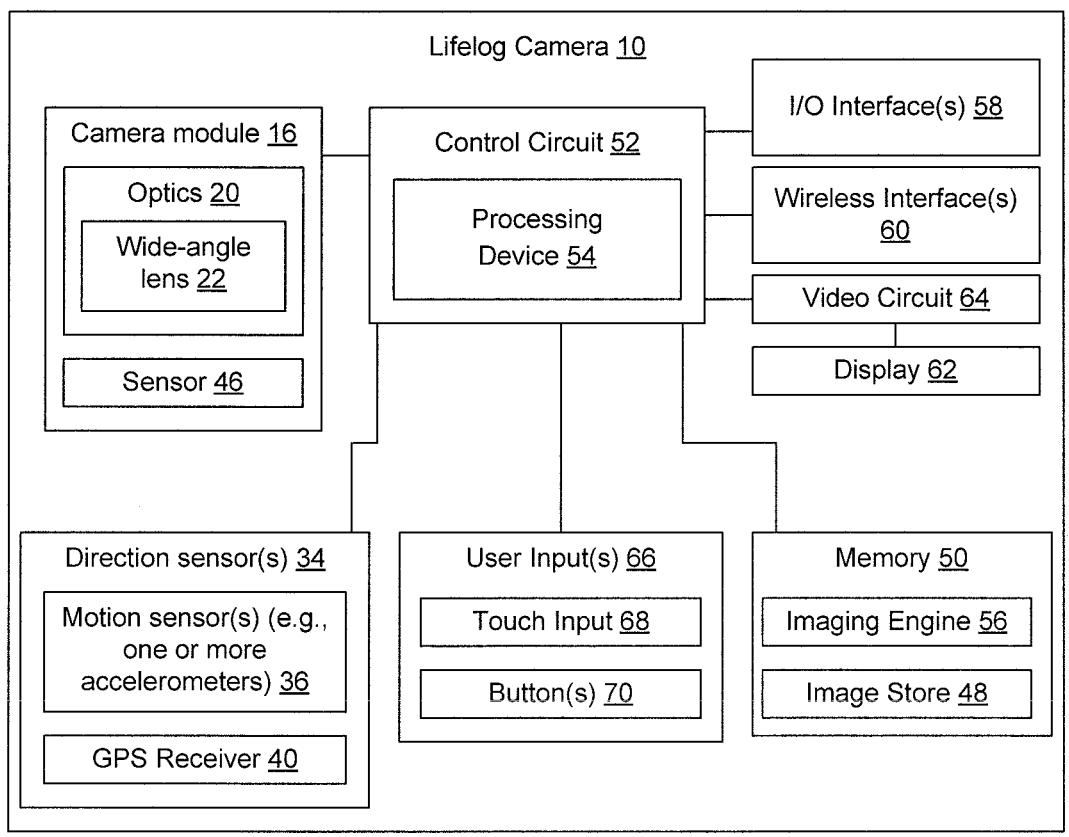
FIG. 3 is a schematic block diagram of the lifelog camera.

With additional reference to FIGS. 2 and 3, the logical flow may start in block 12 in which the lifelog camera 10 may capture and store a digital image of a scene defined by a field of view 14 of the lifelog camera 10. The lifelog camera 10 includes a camera module 16. The camera module 16 includes optics 20. The optics 20 may include a wide-angle lens 22. The wide-angle lens 22 may be a fisheye lens.

Following capturing and storing the image in block 12, the logical flow may proceed to block 26 where the forward-facing direction 28 of a user 30 of the lifelog camera 10 is identified. In one embodiment, the forward-facing direction 28 of the user 30 of the lifelog camera 10 is assumed to be identical to the direction of travel 32 of the user 30, which is assumed to be identical to the direction of travel of the lifelog camera 10 (because the user 30 wears the lifelog camera 10). The direction of travel 32 may be determined, for example, using recent images captured by the lifelog camera 10 (i.e., by applying motion-blur analysis and/or horizon line detection algorithms) or using a direction sensor 34. The direction sensor 34 may be or include, for example, a motion sensor 36 (e.g., an accelerometer) or a GPS receiver 40. If the direction sensor 34 is an accelerometer, or includes an accelerometer, the accelerometer may be used, for example, in an inertial navigation system to determine the direction of travel of the lifelog camera 10 (and therefore the direction of travel 32 of the user 30 and the forward facing direction 28 of the user 30.) Similarly, if the direction sensor 34 is a GPS receiver 40, the direction of travel of the lifelog camera 10 (and therefore the direction of travel 32 of the user 30 and the forward facing direction 28 of the user 30), may be determined, for example, by comparing recent GPS location readings to prior GPS location readings. The forward-facing direction 28 of the user 30 of the lifelog camera 10 may also be identified using the angle of the head of the user 30. For example, where the head, or a portion of the head, of the user 30 appears in a captured image, the angle and orientation of the head of the user 30 can be determined from the image and used to identify the forward-facing direction 28 of the user 30 of the lifelog camera 10.

The forward-facing direction 28 of the user 30, direction of travel 32 of the user 30 and direction of travel of the lifelog camera 10 may be determined, for example, with reference to the named directions and their intermediates (e.g., north, east, south, west, northeast, northwest, southeast, southwest etc.), or to the corresponding degrees of a compass (e.g., north =0°, east =90°, south =180°, west =270°, etc.).

Once the forward-facing direction 28 of the user 30 has been identified, the logical flow proceeds to block 42 where a determination is made as to whether the forward facing direction 28 is within the field of view 14 of the lifelog camera 10. This determination can be made, for example, by identifying which directions are included within the field of view 14 of the lifelog camera 10, and determining if the forward-facing direction 28 is included therein. The directions included within the field of view 14 of the lifelog camera 10 may be determined by using gyroscope and/or compass readings, along with information regarding the size of the field of view 14 of the lifelog camera 10, to determine the direction of the optical axis 49 of the lifelog camera 10 when the image was captured and how far to either side the field of view 14 extends. For example, the optical axis 49 of the lifelog camera 10 might have been pointing northwest (315°) when the image was captured. If the field of view 14 of the camera is 180°, then the directions included within the field of view 14 of the lifelog camera 10 would be from 225° to 45° (southwest to northeast). If the forward-facing direction 28 of the user 30 is not within the directions included within the field of view 14 of the lifelog camera 10, the logical flow may return to block 12 to capture and store another image. On the other hand, if the forward-facing direction 28 of the user 30 is within the directions included within the field of view 14 of the lifelog camera 10, the logical flow proceeds to block 44. For example, if the directions included within the field of view 14 of the lifelog camera 10 were from 225° to 45° (southwest to northeast) and the forward-facing direction 28 of the user 30 were 0° (north), the forward-facing direction 28 of the user 30 would be within the directions included within the field of view 14 of the lifelog camera 10 and the logical flow proceeds to block 44.

In block 44, a component of the image that contains image data corresponding to a portion 45 of the scene containing the forward-facing direction 28 is identified. An exemplary way of identifying the component includes, but is not limited to, using the directions included within the field of view 14 of the lifelog camera 10 to determine the directional location of various points in the image, identifying the portion of the image that contains the forward-facing direction 28 and identifying a component of the image that includes image data for that portion of the scene. For example, if the directions included within the field of view 14 of the lifelog camera 10 extended from 225° to 45° (southwest to northeast) then the image could be divided into slices, with each slice corresponding to a number of degrees from 225° to 45°. Then, if the forward-facing direction 28 was 0° (north), the portion of the image containing the forward-facing direction 28 might be a slice or number of slices corresponding to 0° and the component would include image data from that portion of the image. An exemplary component includes, but is not limited to, a pixel or group of pixels. In one embodiment, the size (expressed in pixels, expressed as a percent or relative portion of the full field of view 14, expressed as a solid angle relative to the field of view 14 and centered or near the forward-facing direction 28, or expressed in some other manner) of the component may be specified in a predetermined or default manner or may be specified by the user 30 of the lifelog camera 10. In one embodiment, the identified component containing the forward-facing direction 28 horizontally corresponds to an area of the full field of view image in a manner that has a predetermined relationship to the forward-facing direction 28, such as an area of the full field of view image falling within ±10° of the forward-facing direction 28 or some other angle (e.g., ±15°, ±20°, etc.). Also, the identified component may have a predetermined aspect ratio so that the identified component containing the forward-facing direction 28 vertically corresponds to the horizontally defined size of the identified component.

The component may be identified, for example, by pixel location information. In one embodiment, the pixel location information may be a pixel located at the center of the component. Identification of a pixel at the center of the component plus size information may be used to identify the component in subsequent post-processing or display operations. In another embodiment, the pixel location information may be one or more pixels at a boundary of a component or some other vector or area-determining values.

In one embodiment, block 44 may also (or alternatively) include identifying an additional component of the image that contains image data corresponding to a portion of the scene that includes features of interest 47, such as food items, faces, animals, buildings, plants, etc. Identifying an additional component might be done, for example, by using known imaging analysis techniques, such as facial detection, to detect features of interest in the image and then determining the portion of the scene that includes a feature of interest. Then, a corresponding portion of the image is identified (e.g., the portion of the image is defined in the manner described above for the component including the forward-facing direction 28 and/or as a group of pixels having a size defined by the relative size of the identified feature of interest).

Following block 44, the logical flow may proceed to block 46. In block 46, the digital image is tagged with the identified component. This tagging may be done by associating information describing the identified component, such as the pixel location information for the identified component, with the file used to save the digital image. In one embodiment, the digital image may also be tagged with an additional identified component for a feature of interest. This tagging may be done by associating information describing the additional identified component, such as the pixel location information for the additional identified component, with the file used to save the digital image.

Following block 46, the logical flow may return to block 12 to capture additional images. For example, where the component of the image that contains image data corresponding to a portion 45 of the scene containing the forward-facing direction 28 is obscured by the body (i.e., the arm, hand or head) of the user 30, additional images may be captured in order to obtain an image in which the component of the image that contains image data corresponding to a portion 45 of the scene containing the forward-facing direction 28 is unobscured.

In addition, or alternatively, the logical flow may proceed to block 48. In block 48, a portion of the digital image is displayed. The image may be displayed on a display of the lifelog camera 10 or may be transferred to another device for display. The displayed portion is smaller than the captured digital image. More specifically, the captured digital image corresponds to the field of view 14 of the camera module 16, but the displayed portion corresponds to the identified component containing the forward-facing direction 28.

In this manner, portions of the captured image remote from the area containing the forward-facing direction 28 are not displayed. It is contemplated that this will increase the interest of the captured images when displayed since the displayed portion relates to portions of the scene that are in front of the user rather than portions that may be to the side of the user due to an optical axis 49 of the camera module 16 not being aligned with the forward-facing direction 28 of the user. But the image data for the undisplayed portions are retained to allow the user to display other portions of the captured image by panning and/or zooming in or out.

In one embodiment, the displayed portion includes the identified additional component for an identified feature of interest instead of or in addition to the component containing the forward-facing direction 28.

With additional reference to FIG. 3, illustrated is a schematic block diagram of an exemplary electronic device configured as a lifelog camera 10. The lifelog camera 10 includes a camera module 16. The camera module 16 includes appropriate optics 20 and a sensor 46 for imaging a scene to generate still images and, in some cases, video. In one embodiment, the optics 20 may include a wide-angle lens 22. In one embodiment, the wide-angle lens is a fisheye lens. Although not illustrated, a microphone may be present to a capture sound component for the video. Images and video captured by the camera module 16 may be stored in an image store 48 of a memory 50.

The lifelog camera 10 includes a control circuit 52 that is responsible for overall operation of the lifelog camera 10, including obtaining images with the camera module 16. In one embodiment, the control circuit 52 includes a processing device 54 that executes operating instructions. In one embodiment, control over the capturing, the storing, and the tagging of an image is embodied as part of an imaging engine 56. The imaging engine 56 also may be stored in memory 50.

The imaging engine 56 may be embodied in the form of an executable logic routine (e.g., lines of code, a software program, firmware, etc.) that is stored on a non-transitory computer readable medium (e.g., the memory 50) of the lifelog camera 10 and that is executed by the control circuit 52. The described operations may be thought of as a method that is carried out by the lifelog camera 10.

The processing device 54 of the control circuit 52 may be a central processing unit (CPU), a microcontroller, or a microprocessor that executes code in order to carry out operation of the lifelog camera 10. The memory 50 may be, for example, one or more of a buffer, a flash memory, a hard drive, a removable media, a volatile memory, a non-volatile memory, a random access memory (RAM), or other suitable device. In a typical arrangement, the memory 50 includes a non-volatile memory for long term data storage and a volatile memory that functions as system memory for the control circuit 52. The memory 50 may exchange data with the control circuit 52 over a data bus. Accompanying control lines and an address bus between the memory 50 and the control circuit 52 also may be present. The memory 50 is considered a non-transitory computer readable medium.

The lifelog camera 10 may include interfaces for establishing communication with another device, such as a computer, a mobile phone, a wireless router for establishing Internet access, etc. An exemplary interface is an input/output (I/O) interface 58 in the form of an electrical connectors and interface circuitry for establishing connectivity to another device using a cable. A typical I/O interface 58 may be a USB port. Operating power and/or power to charge a battery (not shown) of the lifelog camera 10 may be received over the I/O interface 58. The battery may supply power to operate the lifelog camera 10 in the absence of an external power source. Another exemplary interface is a wireless interface 60. The wireless interface 60 may be, for example, an interface 60 that operates in accordance with Bluetooth standards, WiFi standards, or another wireless standard. Multiple wireless interfaces 60 may be present to operate over multiple standards (e.g., Bluetooth and WiFi).

The lifelog camera 10 may include a display 62 for displaying captured images and for assisting the user in adjusting settings. The display 62 may be coupled to the control circuit 52 by a video circuit 64 that converts video data to a video signal used to drive the display 62. The video circuit 64 may include any appropriate buffers, decoders, video data processors and so forth. The lifelog camera also may not include a display, in which case images are viewed using a different device after transferring the images from the lifelog camera to the other device.

The lifelog camera 10 may include one or more direction sensors/inputs 34 that can be used to determine the forward facing direction 28 of the user of the lifelog camera 10. An exemplary direction sensor 34 includes a motion sensor 36, such as one or more accelerometers or one or more gyros, etc. Another exemplary input 34 includes a position data receiver, such as a global positioning system (GPS) receiver 40.

The lifelog camera 10 may include one or more user inputs 66 for receiving user input for controlling operation of the lifelog camera 10. Exemplary user inputs 66 include, but are not limited to, a touch input 68 that overlays or is part of the display 62 (if present) for touch screen functionality, one or more buttons 70, and so forth.

Although certain embodiments have been shown and described, it is understood that equivalents and modifications falling within the scope of the appended claims will occur to others who are skilled in the art upon the reading and understanding of this specification.

What is claimed is:

1. A method of obtaining a digital image tagged with corrected image direction information, the method comprising:
    capturing and storing a digital image of a scene defined by a field of view of a camera used to capture the image, wherein the field of view of the camera is offset from a forward facing direction of a user of the camera;
    identifying a forward-facing direction of the user of the camera, the forward-facing direction within the field of view of the lifelog camera;
    identifying a portion of the digital image that corresponds to the forward-facing direction of the user, the digital image obtained from the camera having a field of view offset from the forward-facing direction of the user;
    identifying a component of the portion of the digital image; and
    tagging the identified component with the corrected image direction information, said corrected image direction information corresponding to the forward-facing direction.

2. The method of claim 1, wherein the camera comprises a wide-angle lens.

3. The method of claim 2, wherein the wide-angle lens comprises a fisheye lens.

4. The method of claim 1, wherein identifying the forward-facing direction of the user comprises determining the direction of travel of the user.

5. The method of claim 4, wherein the direction of travel is determined using an accelerometer.

6. The method of claim 1, wherein the method further comprises identifying an additional component of the image that contains image data corresponding to a portion of the scene containing a feature of interest and tagging the digital image with the identified additional component.

7. The method of claim 6, wherein the method further comprises displaying a portion of the image including the identified additional component, the displayed portion corresponding to a smaller portion of the scene than the captured digital image.

8. The method of claim 1, wherein the method further comprises displaying a portion of the image including the identified component, the displayed portion corresponding to a smaller portion of the scene than the captured digital image.

9. The method of claim 7, wherein the method further comprises displaying additional portions of the image in response to a user command.

10. The method of claim 7, wherein the size of the displayed portions is determined by the user.

11. An electronic device comprising:
    a direction sensor;
    a camera module; and
    a control circuit configured to:
        capture and store a digital image of a scene defined by a field of view of the camera module used to capture the image, wherein the field of view of the camera is offset from a forward facing direction of a user of the camera;
        identify a forward-facing direction of the user of the camera module, the forward-facing direction within the field of view of the camera module;
        identify a portion of the digital image that corresponds to the forward-facing direction of the user, the digital image obtained from the camera having a field of view offset from the forward-facing direction of the user;
        identify a component of the portion of the digital image; and
        tag the identified component with corrected image direction information, said corrected image direction information corresponding to the forward-facing direction.

12. The electronic device of claim 11, wherein the camera module comprises a wide-angle lens.

13. The electronic device of claim 12, wherein the wide-angle lens comprises a fisheye lens.

14. The electronic device of claim 11, wherein identifying the forward-facing direction of the user comprises determining the direction of travel of the user using the direction sensor.

15. The electronic device of claim 14, wherein the direction sensor comprises an accelerometer.

16. The electronic device of claim 11, wherein the control circuit is further configured to identify an additional component of the image that contains image data corresponding to a portion of the scene containing a feature of interest and tag the digital image with the identified additional component.

17. The electronic device of claim 16, wherein the device further comprises a display and wherein the control circuit is further configured to display a portion of the image including the identified additional component, the displayed portion corresponding to a smaller portion of the scene than the captured digital image.

18. The electronic device of claim 11, wherein the device further comprises a display and wherein the control circuit is further configured to display a portion of the image including the identified component, the displayed portion corresponding to a smaller portion of the scene than the captured digital image.

19. The electronic device of claim 17, wherein the control circuit is further configured to display additional portions of the image in response to a user command.

20. The electronic device of claim 17, wherein the size of the displayed portion is determined by the user.

* * * * *